(12) United States Patent
Wang et al.

(10) Patent No.: US 12,466,065 B2
(45) Date of Patent: Nov. 11, 2025

(54) PATH DATASET GENERATION

(71) Applicant: FANUC CORPORATION, Yamanashi (JP)

(72) Inventors: Kaimeng Wang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 18/636,345

(22) Filed: Apr. 16, 2024

(65) Prior Publication Data
US 2025/0319593 A1 Oct. 16, 2025

(51) Int. Cl.
*B25J 9/16* (2006.01)

(52) U.S. Cl.
CPC ........... *B25J 9/1666* (2013.01); *B25J 9/1671* (2013.01)

(58) Field of Classification Search
CPC .............................. B25J 9/1666; B25J 9/1671
See application file for complete search history.

(56) References Cited

U.S. PATENT DOCUMENTS

| | | | |
|---|---|---|---|
| 6,246,931 B1 * | 6/2001 | Shinogi | B25J 9/161 701/25 |
| 7,493,262 B2 * | 2/2009 | Hagelin | G06Q 40/06 709/200 |
| 8,180,711 B2 * | 5/2012 | Malackowski | G06Q 40/04 705/53 |
| 8,700,307 B1 * | 4/2014 | Zhao | B25J 9/1666 701/301 |
| 9,649,765 B2 * | 5/2017 | Frische | B25J 9/1664 |
| 10,023,393 B2 * | 7/2018 | Brazeau | B65G 1/1375 |
| 10,035,266 B1 * | 7/2018 | Kroeger | B25J 9/1664 |
| 10,063,529 B2 * | 8/2018 | Milazzo | B29C 64/00 |
| 10,093,021 B2 * | 10/2018 | Aghamohammadi | G05D 1/0217 |
| 10,291,413 B2 * | 5/2019 | Ramathal | H04L 9/3236 |
| 10,318,979 B2 * | 6/2019 | Frank | G06Q 30/0217 |
| 10,513,077 B2 * | 12/2019 | Mattingly | H04L 9/3297 |
| 10,521,780 B1 * | 12/2019 | Hopkins, III | G06Q 20/3825 |
| 10,824,747 B1 * | 11/2020 | Magerkurth | G06Q 20/3825 |
| 10,915,874 B2 * | 2/2021 | Code | H04L 63/0861 |
| 11,074,663 B2 * | 7/2021 | Rollins | G06Q 50/18 |
| 11,164,165 B1 * | 11/2021 | Andreev | G06Q 20/02 |

(Continued)

*Primary Examiner* — Bhavesh V Amin
(74) *Attorney, Agent, or Firm* — John A. Miller; Shumaker, Loop & Kendrick, LLP

(57) ABSTRACT

A method for generating a dataset of robot motion programs for training a path generation neural network. A large language model is used to configure a task environment and generate code which creates robot simulations. The large language model uses a robot task library and an asset geometry database as inputs. Based on the task and asset inputs and a task instruction, the large language model breaks down the task into steps, then generates code describing robot and object motion to complete the task. The generated code produces robot motions for the task, and a corresponding robot motion program is created and executed in simulation. The simulated robot motion programs are used to generate collision-free robot paths via RRT and/or optimization, and collision-free paths are validated for robot reachability and object placement success. Validated motion programs are added to the dataset and used for training the path generation neural network.

22 Claims, 6 Drawing Sheets

(56) References Cited

U.S. PATENT DOCUMENTS

| | | | |
|---|---|---|---|
| 11,341,488 B2* | 5/2022 | Chapman | G06Q 20/3829 |
| 11,446,820 B2* | 9/2022 | Sokabe | B25J 9/163 |
| 11,707,843 B2* | 7/2023 | Lin | B25J 9/1651 |
| | | | 700/255 |
| 11,724,387 B2* | 8/2023 | Lin | B25J 9/1605 |
| | | | 700/255 |
| 11,813,753 B2* | 11/2023 | Wang | B25J 13/089 |
| 11,833,681 B2* | 12/2023 | Iqbal | G06T 7/74 |
| 11,872,704 B2* | 1/2024 | Lin | B25J 9/1653 |
| 12,122,052 B2* | 10/2024 | Lin | B25J 9/1607 |
| 12,145,277 B2* | 11/2024 | Lin | B25J 19/02 |
| 12,151,379 B2* | 11/2024 | Lin | B25J 9/1666 |
| 12,194,632 B2* | 1/2025 | Iqbal | B25J 9/1669 |
| 12,228,937 B2* | 2/2025 | Huh | G06N 3/09 |
| 12,412,120 B2* | 9/2025 | Cella | H04L 67/562 |
| 2005/0149420 A1* | 7/2005 | Hagelin | G06Q 40/06 |
| | | | 705/35 |
| 2011/0035087 A1* | 2/2011 | Kim | G05D 1/0274 |
| | | | 701/25 |
| 2011/0106306 A1* | 5/2011 | Kim | B25J 9/1664 |
| | | | 901/1 |
| 2011/0106308 A1* | 5/2011 | Eliasson | B25J 9/1664 |
| | | | 700/250 |
| 2011/0172818 A1* | 7/2011 | Kim | B25J 9/1666 |
| | | | 901/2 |
| 2013/0238240 A1* | 9/2013 | Tamai | G01C 21/34 |
| | | | 701/527 |
| 2014/0148949 A1* | 5/2014 | Graca | B25J 9/1671 |
| | | | 700/248 |
| 2014/0257558 A1* | 9/2014 | Frische | B25J 9/1664 |
| | | | 700/245 |
| 2015/0100194 A1* | 4/2015 | Terada | G05D 1/0214 |
| | | | 701/25 |
| 2015/0221053 A1* | 8/2015 | Tapley | G06F 3/1222 |
| | | | 705/310 |
| 2015/0266182 A1* | 9/2015 | Strandberg | B25J 9/1676 |
| | | | 700/255 |
| 2015/0278404 A1* | 10/2015 | Embon | G06F 30/20 |
| | | | 703/13 |
| 2016/0098723 A1* | 4/2016 | Feeney | G06Q 20/065 |
| | | | 705/75 |
| 2016/0292680 A1* | 10/2016 | Wilson, Jr. | H04L 9/30 |
| 2017/0088360 A1* | 3/2017 | Brazeau | G05B 19/41895 |
| 2017/0157769 A1* | 6/2017 | Aghamohammadi | |
| | | | G01C 21/3837 |
| 2017/0193619 A1* | 7/2017 | Rollins | G06Q 50/184 |
| 2017/0221029 A1* | 8/2017 | Lund | G06Q 20/1235 |
| 2017/0279783 A1* | 9/2017 | Milazzo | H04L 9/14 |
| 2017/0348856 A1* | 12/2017 | Nakaya | B25J 9/1666 |
| 2018/0089651 A9* | 3/2018 | Lund | G06Q 20/36 |
| 2018/0181979 A1* | 6/2018 | Frank | G06Q 50/02 |
| 2018/0225660 A1* | 8/2018 | Chapman | G06Q 20/10 |
| 2018/0257306 A1* | 9/2018 | Mattingly | B33Y 50/00 |
| 2019/0314989 A1* | 10/2019 | Sokabe | B25J 9/1664 |
| 2020/0292340 A1* | 9/2020 | Li | G01C 21/3469 |
| 2021/0252707 A1* | 8/2021 | Wang | B25J 9/1671 |
| 2021/0308862 A1* | 10/2021 | Lin | B25J 9/1697 |
| 2021/0308865 A1* | 10/2021 | Lin | B25J 9/1651 |
| 2021/0342836 A1* | 11/2021 | Cella | G06Q 30/0208 |
| 2022/0063099 A1* | 3/2022 | Lin | B25J 9/1664 |
| 2022/0172206 A1* | 6/2022 | Cella | G06N 3/049 |
| 2022/0172207 A1* | 6/2022 | Cella | G06N 3/065 |
| 2022/0172208 A1* | 6/2022 | Cella | G06N 3/065 |
| 2022/0198562 A1* | 6/2022 | Cella | G06Q 40/04 |
| 2022/0366494 A1* | 11/2022 | Cella | H04L 9/3231 |
| 2023/0158670 A1* | 5/2023 | Lin | B25J 9/1666 |
| | | | 700/245 |
| 2023/0173395 A1* | 6/2023 | Cella | G06N 3/0455 |
| | | | 463/25 |
| 2023/0206329 A1* | 6/2023 | Cella | G06Q 20/0855 |
| 2023/0214925 A1* | 7/2023 | Cella | G06Q 30/06 |
| | | | 705/37 |
| 2023/0294287 A1* | 9/2023 | Lin | B25J 9/1607 |
| | | | 700/255 |
| 2023/0302645 A1* | 9/2023 | Lin | B25J 9/1666 |

* cited by examiner

PATH DATASET GENERATION

BACKGROUND

Field

The present disclosure relates generally to the field of industrial robot motion programming and, more particularly, to a method for generating a dataset of robot motion programs which can be used to train a path generation neural network, where a large language model is used to configure a task environment and generate code which creates robot simulations, the simulated robot motion programs are checked for collision avoidance, and validated robot motion programs are added to the dataset.

Discussion of the Related Art

The use of industrial robots to perform a wide range of manufacturing, assembly and material movement operations is well known. A variety of techniques exist for teaching a robot to move from a start point to a goal point. However, when obstacles exist between the start point and the goal point, existing path generation techniques all exhibit certain shortcomings.

One known technique for path generation is to use a teach pendant. The teach pendant communicates with the robot controller and is operated by a human operator to instruct the robot to make incremental moves—such as "jog in the X-direction" or "rotate gripper about local Z-axis". However, the use of a teach pendant for programming a robot in a complicated obstacle environment is often found to be difficult, error-prone and time-consuming. Another known technique for path generation is to use a collaborative robot in a "lead-through" process, where a human operator manually grasps the end of the robot arm and moves the tool or workpiece from the start point to the goal point. The lead-through process has the advantage of capturing human expertise in selecting a path, and also allows collision avoidance evaluation of all parts of the robot during the motion. Unfortunately, it may be impossible for the operator to manipulate the entire robot to avoid collisions in a complex obstacle environment.

Robot teaching by human demonstration is also known, where a human demonstrator manually grasps and moves a workpiece from the start position to the goal position with visual motion capture. However, path generation by human demonstration may lack the positional accuracy needed for precise movement of the workpiece, and path generation by human demonstration does not account for collision avoidance of the robot arm itself with obstacles in the workspace.

Automatic path generation techniques are also known—where the start and goal points are provided, along with geometric definition of the obstacles in the environment—and a path generation computation is performed. One path generation technique uses an encoder/decoder neural network model to compute waypoints based on an obstacle environment and a path start/end points. However, the database of motion programs needed to train the encoder/decoder neural network is difficult and time-consuming to create.

In light of the circumstances described above, there is a need for an improved robot path generation technique which can automatically generate a large number of collision-free paths to populate a dataset used to train an encoder/decoder neural network.

SUMMARY

The present disclosure describes a method for automatically generating a dataset of robot motion programs which can be used to train a path generation neural network. A large language model is used to break down and configure a task environment and generate code which creates robot simulations. The large language model uses a robot task library and an asset geometry database as inputs. Based on the task and asset inputs and a task instruction, the large language model breaks down the task into steps, then generates code describing robot and object motion to complete the task. The generated code produces robot motions for the task, and a corresponding robot motion program is created and executed in simulation. The simulated robot motion programs are used to generate collision-free robot paths via RRT or optimization-based computations, and collision-free paths are validated for robot reachability and object placement success. Validated robot motion programs are added to the dataset to be used for subsequent training of the path generation neural network.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a method for automated robot path dataset generation is merely exemplary in nature, and is in no way intended to limit the disclosed devices and techniques or their applications or uses.

It is well known to use industrial robots for a variety of manufacturing, assembly and material movement operations. It has long been an objective to develop simple techniques for generating robot motion programs which are efficient and which avoid collisions with any obstacles present in the work environment. However, existing path generation techniques all exhibit certain shortcomings.

It is recognized that human intuition and visualization are powerful tools which can be employed in robot path generation. As such, various techniques have been developed for path generation using human input. These techniques—including teach pendant manipulation, collaborative robot lead-through and human demonstration of workpiece pick and place operations—can be very effective in path generation for certain types of operations. However, when a complex obstacle environment is involved—such as a robot mounted on one side of a workpiece and having to reach through an aperture in the workpiece to perform an operation on the other side—these existing path generation techniques often fall short of the capabilities required to generate an efficient and collision-free path.

Automatic path generation techniques are also known—where the start and goal points are provided, along with geometric definition of the obstacles in the environment—and an automated computation of a collision-free path is attempted. Two such techniques, along with their limitations, are discussed below.

Figure 1A:
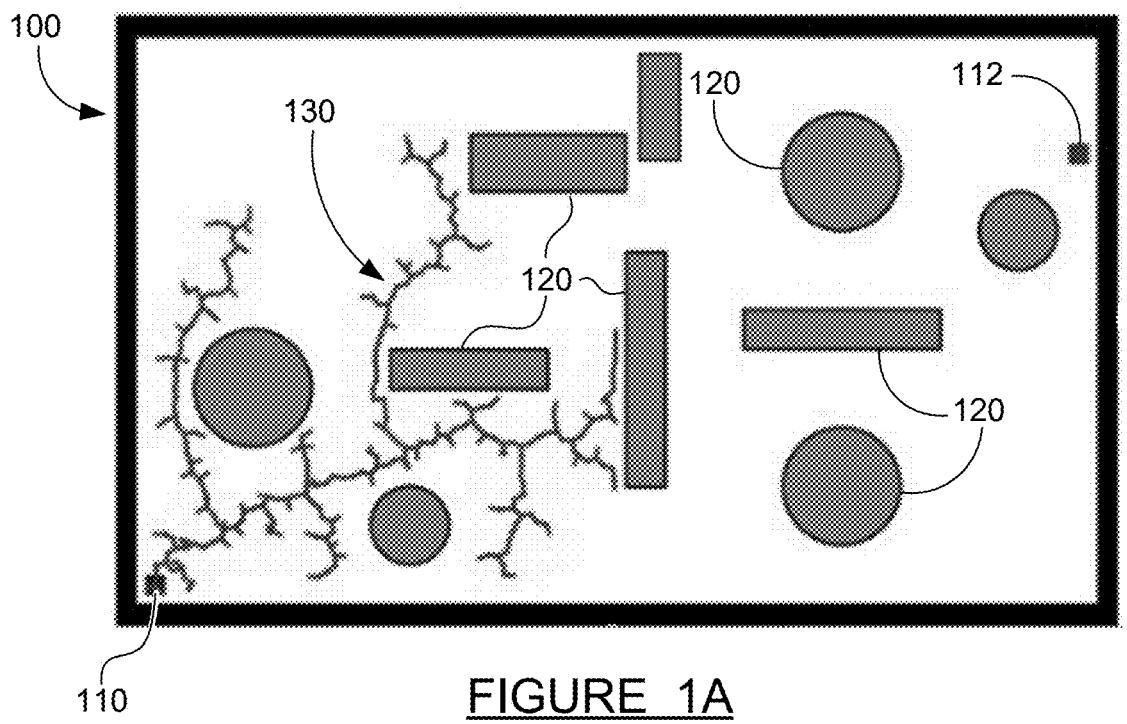
FIG. 1A is an illustration of automatic path generation using a rapidly-exploring random tree (RRT) technique.
Figure 1B:
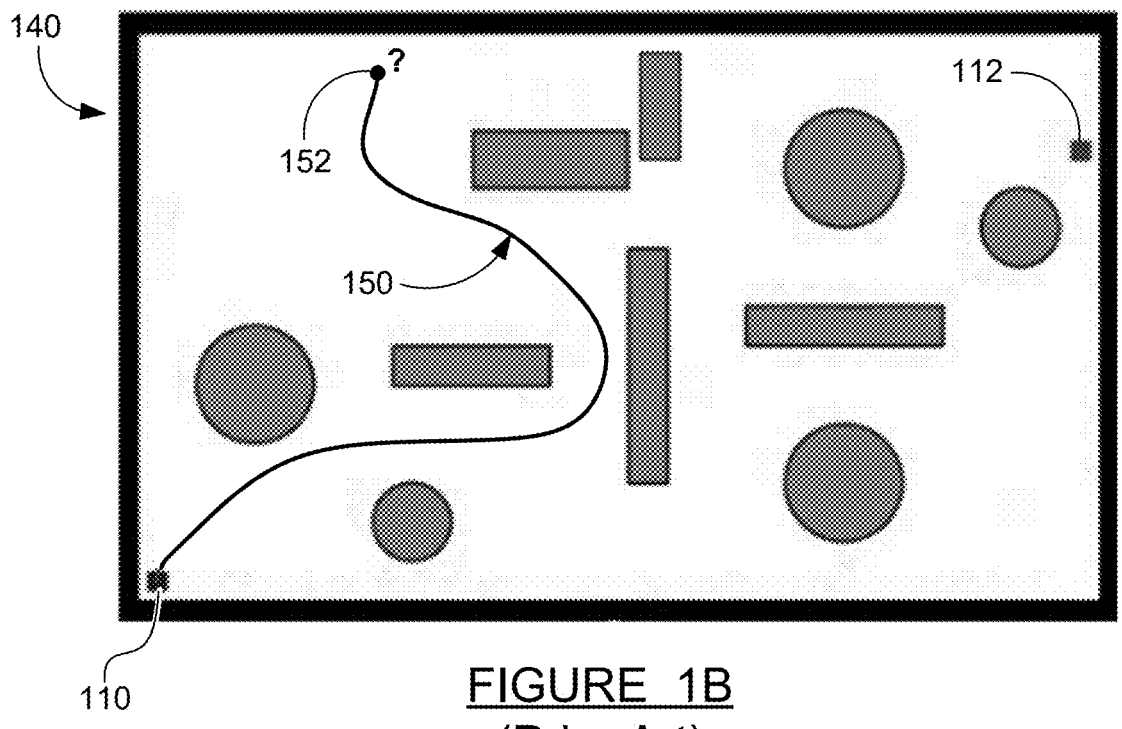
FIG. 1B is an illustration of automatic path generation using an optimization-based technique, as known in the art.

FIG. 1A is an illustration of automatic path generation using a rapidly-exploring random tree (RRT) technique, and FIG. 1B is an illustration of automatic path generation using an optimization-based technique, as known in the art. In FIG. 1A, an RRT path generation scenario 100 is illustrated. In the scenario 100, a collision-free path is desired from a start point 110 to a goal point 112. Numerous obstacles 120 exist in the workspace between the start point 110 and the goal point 112. An RRT-generated path 130 is depicted partway through its growth process.

As known by those skilled in the art, the RRT method proposes a new waypoint within an incremental distance from a previous path point (or the start point 110), and evaluates the feasibility of a path segment from the previous path point to the new waypoint. If the path segment is collision-free, then the new waypoint is added to the path, and another new waypoint is evaluated. Many branches develop in the RRT path, and eventually a complete path from the start point 110 to the goal point 112 may be found. However, RRT-generated paths are characteristically unnatural in shape, having many short path segments which zig-zag back and forth. For this and other reasons, paths generated using a pure RRT technique are often found to be less desirable than paths generated in other ways.

In FIG. 1B, a scenario 140 contains the same start point 110 and goal point 112, and the same environment of obstacles 120 as in the scenario 100 discussed above. In the scenario 140, an optimization-based technique is used to attempt to find a collision-free path from the start point 110 to the goal point 112. A path 150 extends from the start point 110 partway through the obstacle environment of the scenario 140. Optimization-based path generation methods can produce paths using an objective function which encourages smoothness and efficiency in path routing, and constraints which ensure collision avoidance throughout the path. However, in a complex obstacle environment, optimization-based methods may fail to find a feasible solution. This situation is depicted in the scenario 140, in which case the path 150 extends to a point 152 where it is stuck behind two of the obstacles 120 and hemmed in by an outer boundary of the workspace.

FIGS. 1A and 1B are shown in two dimensions for drawing clarity, however it should be recognized that both the RRT and optimization-based path generation techniques are applicable to three-dimensional objects having six degrees of freedom. In fact, the RRT and optimization techniques can be applied to an entire robot, where all parts of the robot arm and workpiece are checked for interferences in a three-dimensional obstacle environment.

Although the RRT and optimization-based techniques described above may have difficulty finding a collision-free path through a complex obstacle environment, either or both of the techniques may be useful in combination with other methods for path generation. This is discussed further below.

Another automatic path generation technique is disclosed in U.S. patent application Ser. No. 18/355,914, titled HUMAN SKILL BASED PATH GENERATION, filed Jul. 20, 2023 and commonly assigned with the instant application, and hereby incorporated by reference in its entirety. The aforementioned patent application (hereinafter referred to as "the '914 application") discloses a technique which uses a trained encoder/decoder neural network to compute a waypoint distribution through an obstacle environment, and then performs additional computations to generate a collision-free path for a robot moving a tool or workpiece.

Figure 2:
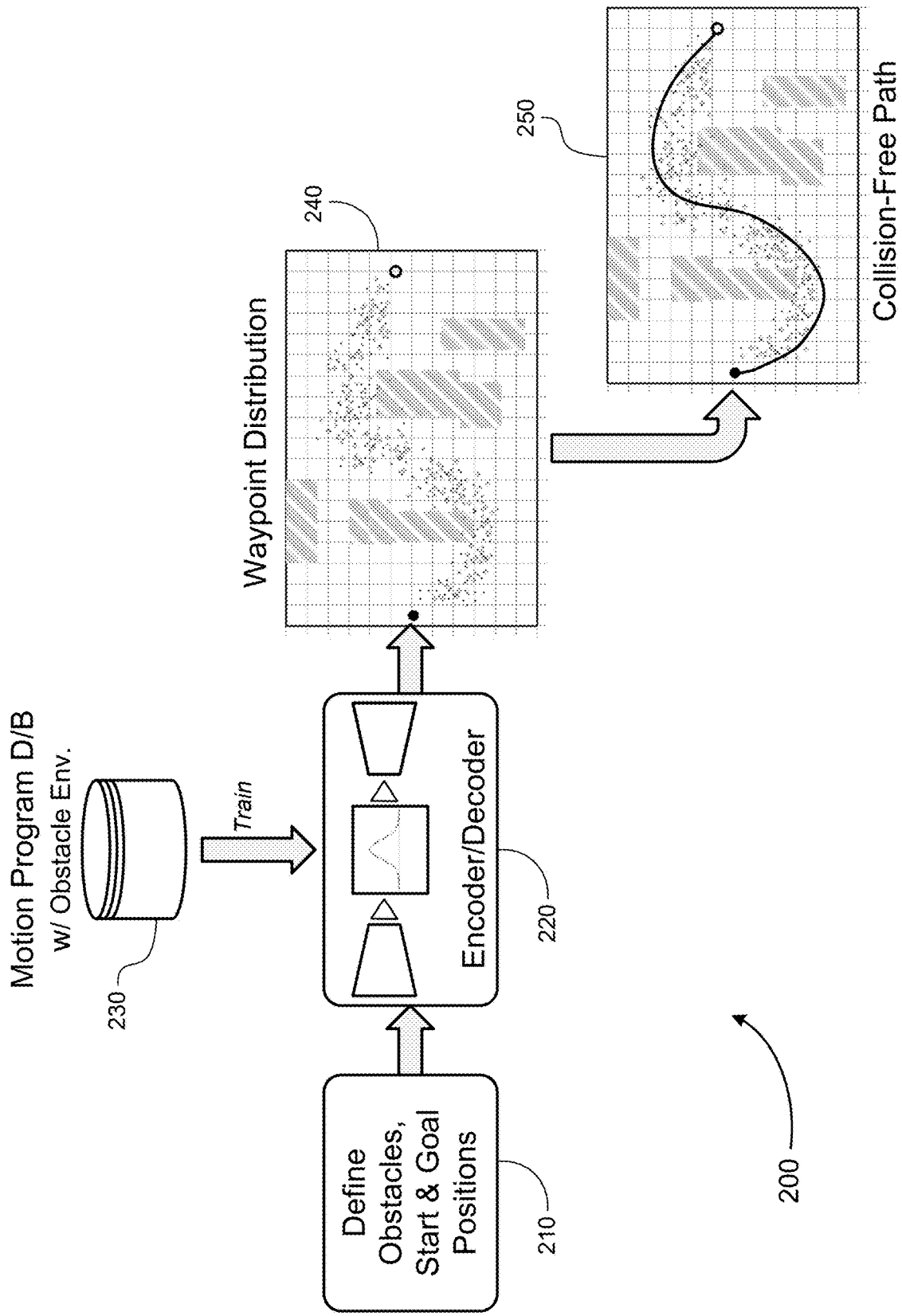
FIG. 2 is a block diagram illustration of a system for robot path generation, according to an embodiment of a previous disclosure.

FIG. 2 is a block diagram illustration of a system 200 for robot path generation, as disclosed in the '914 application. At a block 210, obstacle data for a workspace environment are provided, along with start and goal point locations for a new path to be computed. These inputs correspond to the scenarios 100 and 140 depicted in FIGS. 1A/1B and discussed earlier. Instead of computing a path directly, the inputs from the block 210 are provided to an encoder/decoder block 220. The encoder/decoder block 220 includes encoder and decoder neural networks configured to extract skills from existing robot motion programs, and apply those skills to compute a path in a new obstacle environment. The encoder/decoder block 220 is discussed in detail in the '914 application.

A database 230 of existing motion programs is also provided to the encoder/decoder block 220. The database 230 includes robot motion programs which were generated using any suitable technique, such as by human demonstration. The database 230 includes a plurality of motion programs (robotic paths) and, for each motion program, a definition of the obstacle environment corresponding to the robotic path. In this way, the database 230 characterizes the manner in which a human expert or other suitable training source solves a motion programming problem for various obstacle environments. That is, the database 230 captures the behaviors such as path curvatures and obstacle avoidance distances in tracing a path from a start point to a goal point. The database 230 is used to train the encoder/decoder block 220. The skills embodied in the database 230 are extracted by the encoder/decoder block 220 and ultimately used to generate a path for a new obstacle environment.

The encoder/decoder block 220 produces a waypoint distribution 240 which contains a distribution (sort of a cloud path) of waypoints in a workspace environment containing the obstacles defined in the input block 210. The waypoint distribution 240 is then used to generate a collision-free path 250 using either the RRT technique or the optimization-based technique discussed above. The system 200 captures the path generation skills embodied in the database 230, applies those skills to chart a path through a new obstacle environment, and employs the power of automated path generation techniques, in a manner which overcomes the limitations of existing path generation methods.

In an ideal situation, the database 230 would be populated with robotic motions from human demonstration, with collision-free robotic paths which capture human skill and intuition in moving the robot from a start point to a goal point through a complex obstacle environment. However, it can be difficult and time-consuming to produce a sufficient number of motion programs—to train the encoder/decoder block 220—through human demonstration. The techniques of the present disclosure have been developed to automatically generate a large number of collision-free robotic paths, thus providing a convenient method of populating the database 230 for training the encoder/decoder block.

Figure 3:
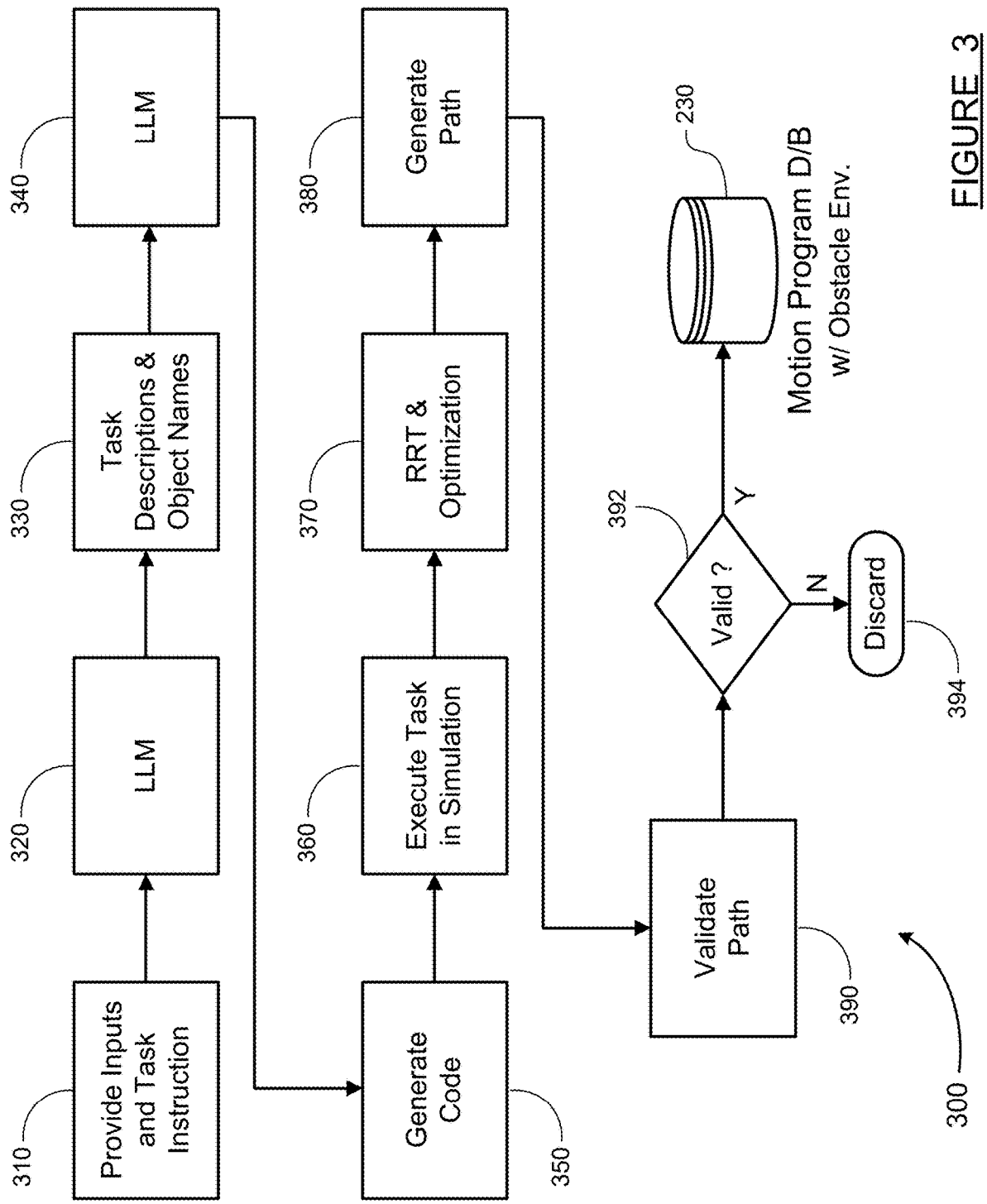
FIG. 3 is a flowchart diagram of a technique for automatic path dataset generation, using a large language model to generate code simulating a robot task, where validated paths are added to a training database, according to an embodiment of the present disclosure.

FIG. 3 is a flowchart diagram 300 of a technique for automatic path dataset generation, using a large language model to generate code simulating a robot task, where validated paths are added to a training database, according to an embodiment of the present disclosure. FIG. 3 depicts a high-level overview of a "pipeline" of steps for creating and validating motion programs, using a large language model artificial neural network and other techniques. Motion programs produced by the pipeline are be added to the database for encoder/decoder training. Details of the steps and elements of FIG. 3 are discussed later with respect to subsequent figures.

At box 310, inputs and task instructions are provided. The inputs provided include an asset library and a task library. The asset library is essentially a database of computer-aided design (CAD) models of objects which may be used in a task simulation. The objects in the asset library may include geometry primitives (e.g., cubes, spheres), workpiece designs, fixtures and other obstacles known to exist in a robotic workspace, etc. The asset library may also include robot arm elements and grippers and the like. The task library includes primitive robotic tasks (e.g., select object, grasp object, move object, place object) which can be combined to perform more complicated tasks. The task library may be populated with tasks specific to a particular industrial robot-such as a six-axis articulated robot of a particular model (with known arm geometry, kinematics, etc.) These libraries are discussed further below.

The task instructions provided at the box 310 include a description of the robotic operation to be performed. A simple example would be, "place blocks in stacks based on color". The task instruction can be considered to include additional information needed to perform the robotic operation, such as a start position and a goal position, and the identity of a workpiece which is to be operated upon.

A large language model (LLM) block 320 receives the inputs from the box 310 and breaks down the overall operation into a set of tasks from the task library and the corresponding objects from the asset library. A large language model is an artificial neural network configured for the ability to achieve general-purpose language generation and understanding. Large language models acquire these abilities by learning statistical relationships from instructional documents during a training process which may include self-supervised and semi-supervised learning. The task breakdown from the large language model 320, including task descriptions for a sequence of steps and object names, are provided in a box 330.

A large language model block 340 takes the task descriptions and object names from the box 330 and generates code at box 350 (in a programming language such as Python) to simulate the operation. The large language model in the block 340 is the same as the large language model in the block 320, essentially performing a second operation (code generation) after the previous operation (task breakdown). Using the code generated at the box 350, the operational task is executed in simulation at box 360, which includes simulating the articulation of the robot arm to move the workpiece according to the input task instruction. The simulated motions of the robot arm and workpiece from the box 360 are provided to a box 370, where RRT and/or optimization-based techniques are used to generate a collision-free path at box 380.

A final validation of generated paths is performed at box 390, including ensuring that the generated path is collision-free, is feasible from a robot reachability standpoint, and that the workpiece or object being moved reaches and is stable at the goal position. At decision diamond 392, it is determined whether all validation criteria are met. Paths which do not pass all aspects of validation are discarded at terminus 394. Paths which pass all aspects of validation are added to the motion program database 230—for use in training the encoder/decoder neural network as shown in FIG. 2. FIG. 3 provides a high-level overview of the path dataset generation database pipeline of the present disclosure; the steps of the pipeline are discussed in detail below.

Figure 4:
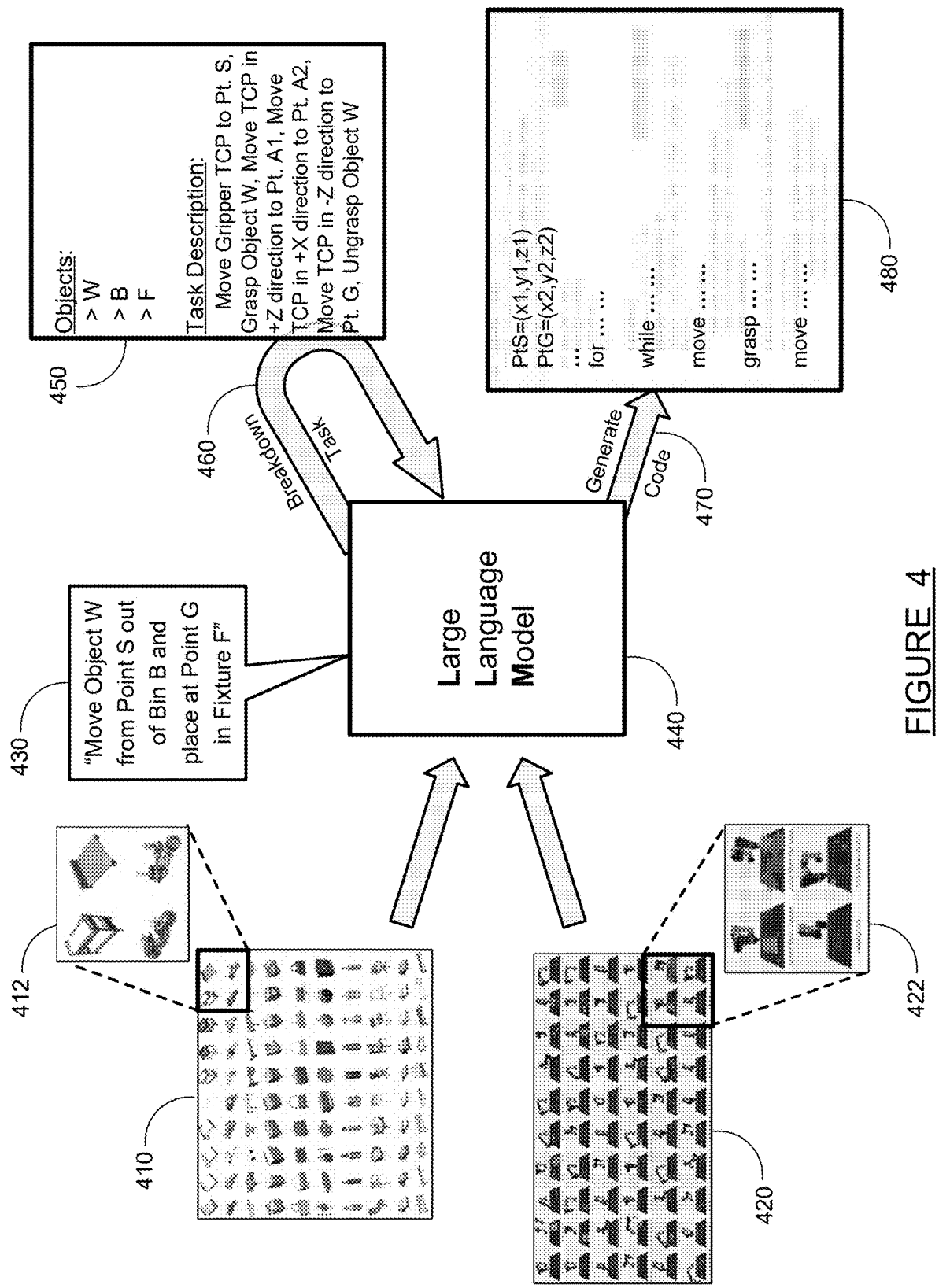
FIG. 4 is an illustration of the inputs and outputs of the large language model of the path dataset generation pipeline of FIG. 3, including asset and task library inputs along with a task instruction, and task breakdown and code generation outputs, according to embodiments of the present disclosure.

FIG. 4 is an illustration of the inputs and outputs of the large language model of the path dataset generation pipeline of FIG. 3, including asset and task library inputs along with a task instruction, and task breakdown and code generation outputs, according to embodiments of the present disclosure. A large language model 440 is depicted in the middle of FIG. 4. The large language model 440 corresponds with both the box 320 and the box 340 of FIG. 3; the large language model is shown twice in FIG. 3 because FIG. 3 is a block diagram of the steps and elements in the path dataset generation pipeline.

In FIG. 4, inputs to the large language model 440 are at the left and top-left, and outputs from the large language model 440 are at the right. An asset library 410 includes CAD models of any object which may be referenced in the path generation. This includes workpieces, tools, fixtures, tables, bins, and any other object which could be moved by the robot or could be an obstacle to the robot when moving. The asset library 410 is shown with many very small graphical icons; these are not meant to be individually significant in viewing FIG. 4; they simply represent a large library of object or asset data. An enlargement 412 shows more detail of a few of the items in the asset library 410; even these are simply visually representative of the CAD solid model data for the many objects in the asset library 410.

A task library 420 includes robotic tasks which can be selected by the large language model 440 to perform individual steps in a complete robotic operation. The tasks in the task library 420 may be defined for a particular robot architecture—such as a five-axis articulated robot, for example. Many primitive and elemental robotic tasks are included in the task library 420—such as reposition gripper, grasp object, move object to goal point, move object vertically in positive Z axis direction, place/ungrasp object, etc. The task library 420 may also include tasks which are more complex than a simple primitive move or grasp—such as insertion of an object into an aperture, for example. The task library 420 is shown with many very small graphical icons; these are not meant to be individually significant in viewing FIG. 4; they simply represent a large library of robot tasks. An enlargement 422 shows more detail of a few of the items in the task library 420; even these are simply visual representations of the tasks in the task library 420.

The final input to the large language model 440 is a task instruction 430. A non-limiting illustrative example of a task instruction is as follows: "Move Object W from Point S (start point) out of Bin B and place the Object W at Point G (goal point) in Fixture F". The task instruction 430 is defined in plain language (e.g., English) as it would be spoken. It can be observed that the example task instruction listed above requires the large language model 440 to identify objects (workpiece W, bin B, fixture F), understand geometric information (start and goal points), and figure out how to perform the overall task using the tasks in the task library and in view of implied constraints (moving the workpiece up and out of the bin and then to the goal point). Other examples of task instructions include "insert objects into mating objects of the same color", and human-directed multi-step instructions such as "build a cabinet using vertical block pieces B5 and horizontal shelf pieces S7; then place objects of type X on the lower shelf and objects of type Y on the upper shelf".

Given the inputs described above, the large language model 440 interprets the task instruction 430 and breaks it down into individual steps from the task library 420 involving objects from the asset library 410. The result of the task breakdown is shown in box 450, where the objects are identified, and a narrative of the overall task operation is written. For example, in the case of the quoted task instruction 430, the large language model has determined that it must first move the gripper (at the end of the robot arm, identified by a tool center point or TCP) to the start point S and grasp the workpiece W, then move the tool center point vertically upward in order to clear the bin, then further reposition the tool center point before moving the workpiece to the goal point.

As indicated by U-turn arrow 460, the task breakdown in the box 450 then used by the large language model 440 for the next step depicted by arrow 470—which is to generate code (programming instructions) which objectively performs the task breakdown as described in the narrative. A representation of the resulting code is shown in box 480, including variable definition, and programming logic and commands. In one embodiment, the code in the box 480 programmatically defines movements of the robot gripper and workpiece as the complete task operation is performed.

Figure 5:
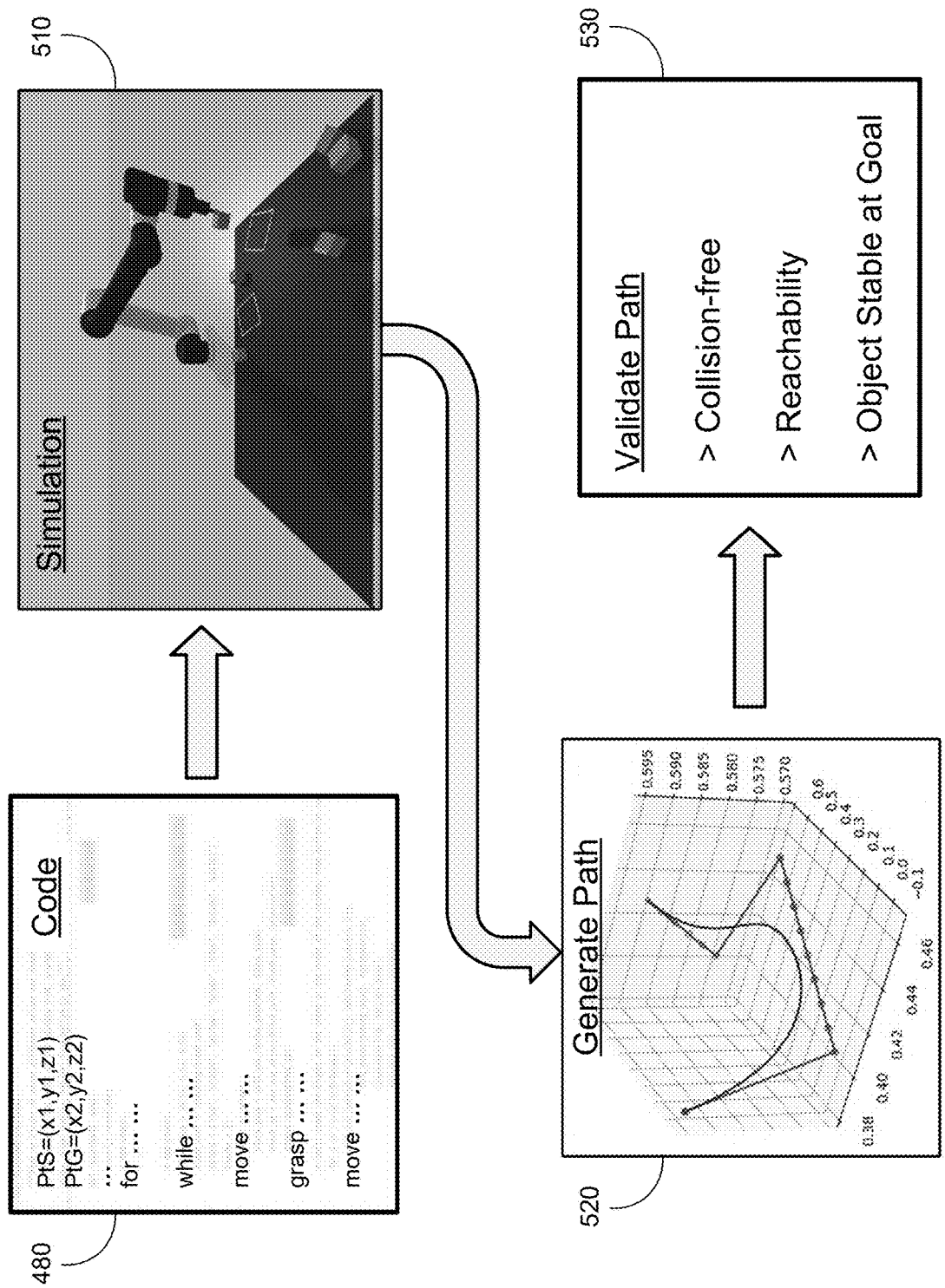
FIG. 5 is an illustration of the simulation and path generation steps of the path dataset generation pipeline of FIG. 3, along with validation of generated paths, according to embodiments of the present disclosure.

FIG. 5 is an illustration of the simulation and path generation steps of the path dataset generation pipeline of FIG. 3, along with validation of generated paths, according to embodiments of the present disclosure. FIG. 5 begins where FIG. 4 ended, with the code in the box 480 which programmatically defines movements of the robot gripper and workpiece as the complete task operation is performed. Based on the gripper movements, a complete robot motion program can be calculated, such as by using inverse kinematics. The complete robot motion program, including motions of all joints in the articulated robot, enables a simulation of robot and workpiece movement as shown in box 510.

The simulation at the box 510 was created based on gripper and workpiece motions, which in turn were synthesized by the large language model to complete the defined task. As such, the simulated robot motions at the box 510 are not guaranteed to be collision-free, particularly when considering all elements of the robot arm along with the workpiece, and even more so when the obstacle environment is complex. Thus, the simulated robot motions from the box 510 are used as input to a path generation box 520, where RRT and/or optimization-based techniques are used to generate a collision-free path.

In one embodiment, at the box 520, an optimization-based method may be employed which takes the simulated robot motions from the box 510 as an initial path, and performs an optimization computation with an objective function formulated to maximize path quality (or minimize path length and cycle time), and a constraint which penalizes interference between any part of the robot or the workpiece and any obstacle. The optimization solver may determine, for example, that the robot arm interferes with an obstacle when reaching through or around the obstacle, where the optimization solver finds a solution which eliminates the interference by positioning the inner and outer robot arms differently while keeping the tool center point path the same. In this way, the optimization computation generates a path which is collision-free while embodying the general path shape characteristics defined by the large language model.

The RRT method may be used to find a collision-free path at the box 520 in a similar manner to that described above for the optimization-based method—starting with the robot motions from the box 510, and searching for new waypoints which resolve any detected interferences. Both RRT and optimization methods may also be used—such as where RRT is used to explore the configuration space and find a collision-free path, and optimization is used to improve the quality of the collision-free path found by the RRT method.

The collision-free path generated at the box 520 is subject to a final validation at a box 530. In one embodiment, the validation includes ensuring that the path is collision-free, that robot reachability is feasible for all points in the path, and that the object (workpiece) is stable at the goal point. Some of these validation parameters may already be known if the path generation at the box 520 completed successfully. The stability of the workpiece object at the goal point may be a separate calculation to ensure that the workpiece is not placed upside down or in some unstable pose or location. If all of the validation parameters are met, the generated path is added to the training database as discussed earlier.

Referring back to FIG. 3, along with the details of the steps illustrated in FIGS. 4 and 5, the overall path generation pipeline can be employed to automatically populate the database 230 with many collision-free paths (motion programs)—by varying the start and goal point positions, varying starting workpiece pose, varying the obstacle environment, and so forth. Once populated with many collision-free motion programs having desirable path characteristics, the database 230 may be used for training the encoder/decoder neural network system as shown in FIG. 2. It may be desirable to fine tune the pre-trained neural network system with a smaller number of paths from another source such as human demonstration.

Figure 6:
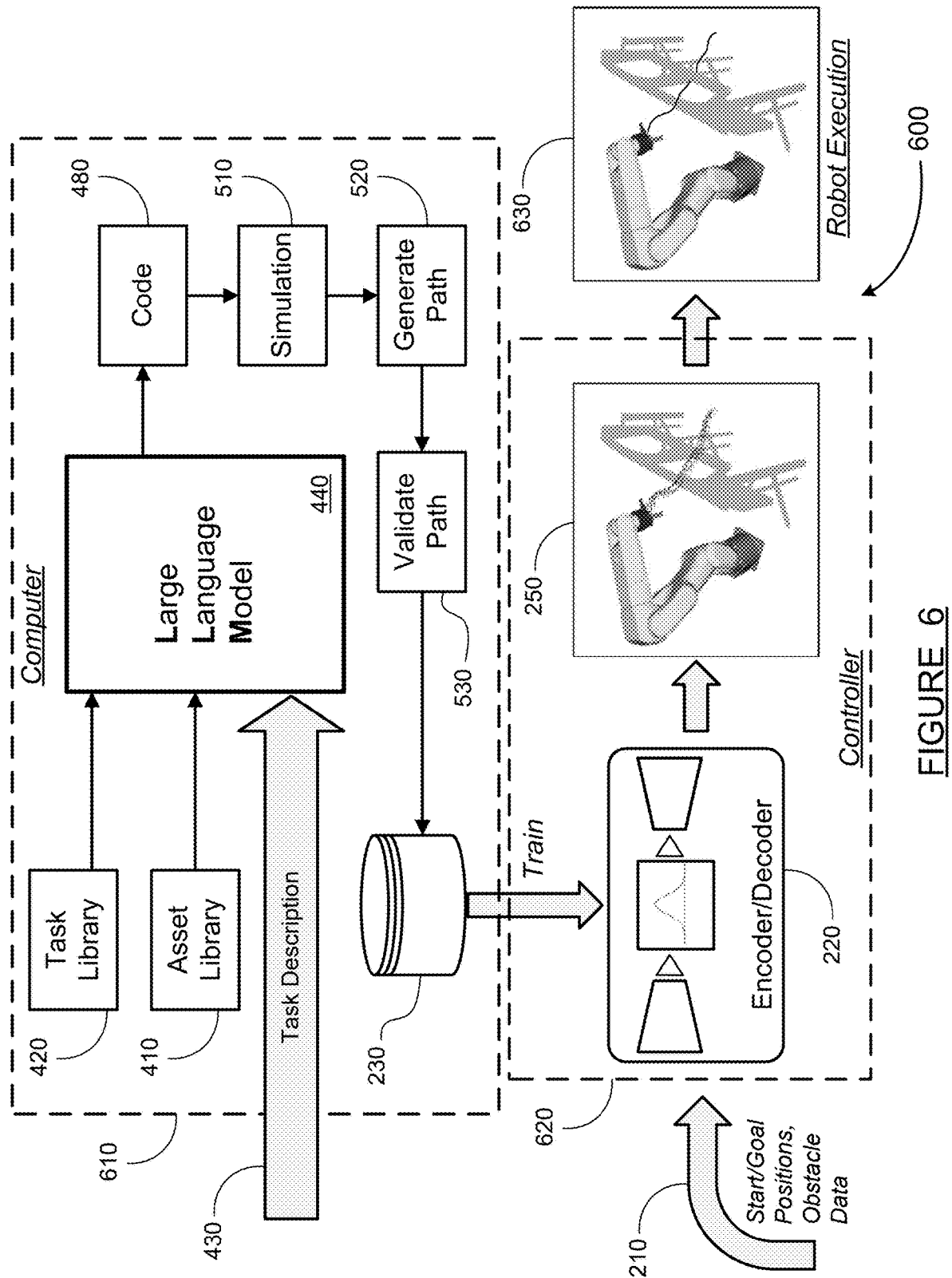
FIG. 6 is a block diagram illustration of a system for automatic path dataset generation, training an encoder/decoder neural network using the generated dataset, and robotic path generation and execution, according to embodiments of the present disclosure.

FIG. 6 is a block diagram illustration of a system 600 for automatic path dataset generation, training an encoder/decoder neural network using the generated dataset, and robotic path generation and execution, according to embodiments of the present disclosure. The system 600 generally comprises a computer or computing device 610, a robot controller 620 and a robotic workcell 630.

The computer 610 is any computing device suitable for performing the path dataset generation tasks depicted in FIGS. 4-6 and discussed earlier. The computer 610 may be a general purpose computer or server, or the computer 610 may be a device selected for its performance in running the large language model 440.

The large language model 440 runs on the computer 610, receiving the inputs discussed earlier—namely, the asset library 410, the task library 420 and the task description 430. The large language model 440 breaks down the task and produces the code 480. All of these operations were depicted in FIGS. 4-5 and discussed above. The code 480 is used to create a simulation 510, and the simulation 510 is used to generate a path at 520 using RRT and/or optimization techniques. The path 520 is validated at 530, and validated paths are added to the database 230, as also shown in FIGS. 4 and 6.

The database 230 is used to train the encoder/decoder neural network 220, as discussed earlier with respect to FIG. 2. In production robotic operations, inputs 210 for a robot task are provided to the encoder/decoder 220 running on the controller 620, which computes a robot path at 250. The controller 620 provides the computed robot path to a robot running in the robotic workcell 630. The robot in the workcell 630 performs the operation using the motion program provided by the controller 620.

The division of tasks between the computer 610 and the controller 620 may be somewhat different than shown in FIG. 6. For example, the computer 610—in addition to creating the training database 230—could also train and run the encoder/decoder 220 to compute a path from the inputs 210. In this scenario, the computer 610 would communicate the computed path to the controller 620, and the controller 620 would send commands to the robot to execute the motion program in the robotic workcell 630.

Throughout the preceding discussion, various computers and controllers are described and implied. It is to be understood that the software applications and modules of these computer and controllers are executed on one or more computing devices having a processor and a memory module. In particular, this includes the processors in the computer 610 and the robot controller 620 of FIG. 6, where the controller/computer are configured to perform the path dataset generation computations in the manner discussed above. The computing device(s) may include specialized devices configured specifically for execution of convolutional and/or encoder/decoder neural network systems.

As outlined above, the disclosed techniques for path dataset generation provide several advantages over existing robot path generation methods. The disclosed techniques enable automatic and rapid creation of a database for training an encoder/decoder neural network system, without having to generate each training path by human demonstration. The paths in the training dataset are validated as collision-free, and are effective for neural network training because each path also defines the obstacle environment for which it was computed.

While a number of exemplary aspects and embodiments of path dataset generation have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot path dataset generation, said method comprising:
providing a task library, an object asset library and a textual instruction for a task to a large language model (LLM) running on a computer having a processor and memory;
generating code containing programming instructions for a robot to perform the task, by the LLM;
executing a simulation of the robot performing the task using the code;
generating a collision-free robot path from the simulation using a collision avoidance path generation algorithm;
validating the robot path against a set of path quality criteria; and
when the robot path meets the path quality criteria, adding the robot path and data defining an obstacle environment to a path dataset.

2. The method according to claim 1 wherein the task library includes definitions of primitive tasks and task sub-combinations which are combinable to perform the task.

3. The method according to claim 1 wherein the object asset library includes three-dimensional models of objects involved in the task, including workpieces, robot arm components, grippers, fixtures and obstacles.

4. The method according to claim 1 wherein generating code includes writing programming instructions defining motions of a tool center point, at an end of a robot arm, necessary to perform the task.

5. The method according to claim 4 wherein the LLM first writes a narrative of steps necessary to perform the task based on the textual instruction, then writes the programming instructions corresponding with the narrative of steps.

6. The method according to claim 4 wherein executing a simulation includes calculating motions of all parts of the robot corresponding with the motions of the tool center point.

7. The method according to claim 6 wherein calculating motions of all parts of the robot includes using an inverse kinematic calculation algorithm.

8. The method according to claim 1 wherein generating a collision-free robot path includes using the simulation of the robot as an initial path, and using either a rapidly-exploring random tree (RRT) algorithm or an optimization-based algorithm to generate the collision-free robot path.

9. The method according to claim 1 wherein validating the robot path includes verifying that the robot path is collision-free, that all motions of the robot in the robot path are feasible, and that the task is completed successfully.

10. The method according to claim 1 wherein the path dataset is populated with a plurality of validated robot paths, each generated based on a different combination of the textual instruction, start and goal points, and the obstacle environment.

11. The method according to claim 10 further comprising training a neural network system using the path dataset, including supervised learning training of a neural network.

12. The method according to claim 11 further comprising generating a collision-free robot motion program based on inputs for an operation, using the neural network system, and sending instructions causing a robot to perform the operation using the collision-free robot motion program.

13. A method for controlling a robot, said method comprising:
generating a collision-free robot motion program based on inputs for an operation, using a neural network system running on a computing device, and sending instructions causing the robot to perform the operation using the collision-free robot motion program,
where the neural network system is trained using a path dataset in a supervised learning process,
and where the path dataset is populated with a plurality of validated paths, each path generated based on a different combination of a textual instruction, start and goal points, and an obstacle environment, using steps including;
providing a task library, an object asset library and the textual instruction for a task to a large language model (LLM);
generating code containing programming instructions for the robot to perform the task, using the LLM;

executing a simulation of the robot performing the task using the code;

generating a collision-free robot path from the simulation using a collision avoidance path generation algorithm;

validating the robot path against a set of path quality criteria; and when the robot path meets the path quality criteria, adding the robot path and data defining the obstacle environment to the path dataset.

14. A system for robot path dataset generation, said system comprising:

a computer having a processor and memory, said computer running a large language model (LLM) and an algorithm configured with steps including;

providing a task library, an object asset library and a textual instruction for a task to running on;

generating code containing programming instructions for a robot to perform a task, by the LLM, using a task library, an object asset library and a textual instruction for the task;

executing a simulation of the robot performing the task using the code;

generating a collision-free robot path from the simulation using a collision avoidance path generation algorithm;

validating the robot path against a set of path quality criteria; and when the robot path meets the path quality criteria, adding the robot path and data defining an obstacle environment to a path dataset.

15. The system according to claim 14 wherein the task library includes definitions of primitive tasks and task subcombinations which are combinable to perform the task, and the object asset library includes three-dimensional models of objects involved in the task, including workpieces, robot arm components, grippers, fixtures and obstacles.

16. The system according to claim 14 wherein generating code includes writing programming instructions defining motions of a tool center point, at an end of a robot arm, necessary to perform the task, and where the LLM first writes a narrative of steps necessary to perform the task based on the textual instruction, then writes the programming instructions corresponding with the narrative of steps.

17. The system according to claim 16 wherein executing a simulation includes calculating motions of all parts of the robot corresponding with the motions of the tool center point.

18. The system according to claim 14 wherein generating a collision-free robot path includes using the simulation of the robot as an initial path, and using either a rapidly-exploring random tree (RRT) algorithm or an optimization-based algorithm to generate the collision-free robot path.

19. The system according to claim 14 wherein validating the robot path includes verifying that the robot path is collision-free, that all motions of the robot in the robot path are feasible, and that the task is completed successfully.

20. The system according to claim 14 wherein the path dataset is populated with a plurality of validated robot paths, each generated based on a different combination of the textual instruction, start and goal points, and the obstacle environment.

21. The system according to claim 20 wherein the path dataset is used to train a neural network, including supervised learning training of a neural network.

22. The system according to claim 21 further comprising a robot in communication with a robot controller, where a collision-free robot motion program is generated based on inputs for an operation, using the neural network system, and the robot controller sends instructions causing the robot to perform the operation using the collision-free robot motion program.

* * * * *